(12) United States Patent
Pulley

(10) Patent No.: US 8,788,101 B2
(45) Date of Patent: Jul. 22, 2014

(54) HEATING APPARATUS

(75) Inventor: Adam Iain Laurie Pulley, Oxted (GB)

(73) Assignee: Ibex UK Limited, Oxted, Surrey (GB)

( * ) Notice: Subject to any disclaimer, the term of this patent is extended or adjusted under 35 U.S.C. 154(b) by 414 days.

(21) Appl. No.: 12/897,751

(22) Filed: Oct. 4, 2010

(65) Prior Publication Data
US 2011/0082601 A1 Apr. 7, 2011

(30) Foreign Application Priority Data

Oct. 7, 2009 (GB) .................................. 0917537.3

(51) Int. Cl.
*G05B 21/00* (2006.01)
*G05D 23/19* (2006.01)
*F24D 15/00* (2006.01)

(52) U.S. Cl.
USPC .......................................................... 700/276

(58) Field of Classification Search
USPC .......................................................... 700/276
See application file for complete search history.

(56) References Cited

U.S. PATENT DOCUMENTS

| | | | |
|---|---|---|---|
| 4,843,084 A * | 6/1989 | Parker et al. ................... | 700/277 |
| 5,538,181 A * | 7/1996 | Simmons et al. ................ | 236/51 |
| 5,711,480 A * | 1/1998 | Zepke et al. ..................... | 236/51 |
| 5,734,550 A * | 3/1998 | Penniman et al. ........ | 361/679.09 |
| 6,349,883 B1 * | 2/2002 | Simmons et al. ........... | 236/46 R |
| 6,628,997 B1 * | 9/2003 | Fox et al. ......................... | 700/86 |
| 6,804,114 B1 * | 10/2004 | Greer ........................ | 361/679.47 |
| 6,813,719 B2 * | 11/2004 | Athas ............................. | 713/320 |
| 2009/0114370 A1 * | 5/2009 | Konig .............................. | 165/47 |
| 2010/0061053 A1 * | 3/2010 | Adkins et al. ............ | 361/679.47 |

FOREIGN PATENT DOCUMENTS

| | | | | |
|---|---|---|---|---|
| DE | 103 50 358 A1 | 6/2005 | | |
| DE | 10350358 A1 * | 6/2005 | ................ | G06F 1/20 |
| JP | 53-72346 | 6/1978 | | |

OTHER PUBLICATIONS

UK Intellectual Property Office Search Report under Section 17(5) for Application No. GB0917537.3, mailed Jan. 6, 2010, 3 pages.

* cited by examiner

*Primary Examiner* — Mohammad Ali
*Assistant Examiner* — Sivalingam Sivanesan
(74) *Attorney, Agent, or Firm* — Blakely Sokoloff Taylor & Zafman

(57) ABSTRACT

Disclosed herein is a heating apparatus for a domestic or commercial building. The apparatus comprises a controller for determining whether there is a need for heating in the building and a computer system for installation in the building. The computer system includes a data store, a program store storing processor implementable instructions, and at least one processor coupled to the data and program stores for implementing the stored instructions to thereby produce thermal energy. The apparatus also comprises a thermal energy distribution means arranged for transferring the thermal energy from the computer system to at least one other location in the building, to a thermal energy storage means and/or to an industrial process. The apparatus is arranged to operate the computer system to implement processor implementable instructions, to thereby produce thermal energy, in response to the determination of a need for heating in the building. The apparatus may additionally comprise a computer network interface means for coupling the computer system to a computer network, and the computer system may be arranged for implementing processor implementable instructions received over the computer network interface means in response to the detection of a need for heating in the building.

23 Claims, 2 Drawing Sheets

HEATING APPARATUS

FIELD OF THE INVENTION

This invention relates to a heating apparatus for a domestic or commercial building. In particular, the invention relates to a heating apparatus which provides computer processing resource as a by-product of the heating process.

BACKGROUND TO THE INVENTION

Domestic and commercial buildings are commonly provided with a heating apparatus to satisfy the heating needs of the building, for example for space heating of rooms in the building and/or for providing a hot water supply. Such an apparatus is typically designed solely for the purpose of converting the stored energy content of a fuel, such as natural gas or a petroleum derivative, into thermal energy. In recent years there has been a focus on increasing the efficiency of this energy conversion process.

In parallel with the focus on improving the efficiency of heating apparatuses, the provision of computer systems in domestic and commercial buildings has become widespread. Furthermore, the processing power of such computer systems has rapidly increased, with computer systems finding application in all aspects of the use of buildings. This trend has, in part, been facilitated by the development of high speed connections to the Internet.

SUMMARY OF THE INVENTION

According to a first aspect of the invention, there is provided a heating apparatus for a domestic or commercial building, the apparatus comprising:
  a controller for determining whether there is a need for heating in the building;
  a computer system for installation in the building, the computer system including a data store, a program store storing processor implementable instructions, and at least one processor coupled to the data and program stores for implementing the stored instructions to thereby produce thermal energy; and
  a thermal energy distribution means arranged for transferring the thermal energy from the computer system,
  wherein the controller is arranged to operate the computer system to implement processor implementable instructions, to thereby produce thermal energy, in response to the determination by the controller of a need for heating in the building.

It will be appreciated that the energy efficiency of a heating apparatus for a domestic or commercial building may be improved beyond that of a conventional heating apparatus by providing a useful by-product that is not wasted. The invention provides a heating apparatus in which computer processing resource is produced as an easy-to-use "by-product" of the heating process. The invention recognises that, when the computer processing resource is taken into account, a computer system may serve as very efficient heating apparatus for a building, since almost all of the energy consumed by the computer system is converted into heat.

In use of the apparatus, the controller determines whether there is a need for heating in the building. In response to the determination that there is such a need, the computer system is operated to produce thermal energy by implementing processor implementable instructions. The speed at which the instructions are implemented may be varied in order to vary the rate at which thermal energy is produced. By providing the computer system with processor implementable instructions that perform a useful function, the apparatus is able to provide the useful by-product of computer processing resource. The thermal energy produced by the computer system is transferred from the computer system, for example to at least one other location in the building where it is required, by the thermal energy distribution means.

In some embodiments, the computer system may be arranged to implement the same processor implementable instructions or processor implementable instructions of a similar type, whether or not it has been determined that there is a need for heating in the building. In this case, the speed with which the instructions are implemented may be higher when it has been determined that there is a need for heating in the building, to thereby produce higher levels of thermal energy, than it is when it has not been determined that there is a need for heating.

The thermal energy distribution means is preferably arranged for transferring the thermal energy from the computer system to another location in the building, a thermal energy storage means, and/or a medium used in an industrial process.

In preferred embodiments of the invention, the controller is arranged to receive an output signal from a temperature detector and carry out the determination of whether there is a need for heating in the building based on the output signal of the temperature detector. The apparatus may comprise a plurality of temperature detectors, in which case the controller is arranged to receive an output signal from each of the temperature detectors and carry out the determination of whether there is a need for heating in the building based on the output signals of the temperature detectors.

The apparatus may comprise a timing device, in which case the controller may be arranged to carry out the determination of whether there is a need for heating in the building based on an output signal the timing device.

Optionally, the computer system may also be arranged for operation at times when it has not been determined that there is a need for heating in the building, for example when there is a requirement for real-time home entertainment, desktop computing functionality and/or local computer server functionality.

The controller may be a software-implemented controller arranged to be run on the computer system, in which case the hardware complexity of the apparatus may be minimised. Alternatively, the controller may be implemented as separate hardware, for example hardware comprising low-power electronics. In this way it may be possible for the relatively high-power computer system to power-down at times when it has not been determined that there is a need for heating in the building.

In embodiments of the invention, the thermal energy distribution means may comprise any device suitable for transferring the thermal energy from the computer system to another location in the building, such as a location in a different room. Computer processors are typically provided with heat sinks for conducting thermal energy away from the processor. The heat sink may be provided with a channel through which a fluid such as water may be circulated to transfer the thermal energy. The thermal energy distribution means may comprise a heat exchanger.

The thermal energy distribution means may comprise a heat pump for increasing the temperature associated with the thermal energy. In this case, the energy used to operate the heat pump may contribute to the thermal energy output of heating apparatus, such that very high energy efficiency is maintained.

In a particularly preferred embodiment, the apparatus further comprises a computer network interface means for coupling the computer system to a computer network. The computer system is then arranged for implementing processor implementable instructions received over the computer network interface means in response to the detection of a need for heating in the building. In this way, the by-product of computer processing resource can be used to satisfy an external demand therefor. For example, the computer processing resource can be "consumed" by an outside entity providing processor implementable instructions over the computer network interface means for implementation by the computer system. The processor implementable instructions can, for example, control the computer system to provide internet server functions, collect and process data from the Internet, and/or intensively process data received over the computer network.

The computer network interface means may be arranged to couple the computer system to the Internet, for example using a high speed broadband connection of at least 20 Mbps.

In embodiments, the computer system may comprise a plurality of processors each provided on different integrated circuits. By providing a plurality of physically distinct processors in this way, the total thermal energy producing capability of the apparatus may be increased. The computer system may comprise a routing means for routing data and/or the processor implementable instructions received over the computer network interface means to the plurality of physically distinct processors.

The apparatus may comprise a plurality of computer systems each having a data store, a program store storing processor implementable instructions, and at least one processor coupled to the data and program stores for implementing the stored instructions to thereby produce thermal energy. In this way, the total thermal energy producing capability of the apparatus may be increased.

The invention also provides the heating apparatus described above installed in a domestic or commercial building.

Furthermore, the invention provides a distributed computer network comprising a plurality of the heating apparatuses described above and installed in different buildings, wherein the computer system of each heating apparatus is arranged for implementing processor implementable instructions received over the computer network interface means in response to the detection of a need for heating in the building. With this arrangement, the computer processing resource of apparatuses installed in different geographical locations may be pooled to reduce the effects of seasonal and time-of-day-related fluctuations in the demand for heating. The arrangement may, for example, be seen as a replacement for centralised data centres that typically waste the thermal energy they produce.

According to another aspect of the invention, there is provided a method of heating a building using a computer system installed in the building, the computer system including a data store, a program store storing processor implementable instructions, and at least one processor coupled to the data and program stores for implementing the stored instructions to thereby produce thermal energy, the method comprising:
- determining whether there is a need for heating in the building;
- in response to the determination of a need for heating in the building, operating the computer system to implement processor implementable instructions, to thereby produce thermal energy; and
- transferring the thermal energy from the computer system.

This aspect of the invention corresponds to a method of using the heating apparatus described above. The step of transferring the thermal energy may comprise transferring the thermal energy from the computer system to another location in the building, a thermal energy storage means, and/or a medium used in an industrial process.

In a particularly preferred embodiment of the invention, the method further comprises, before the step of operating the computer system to implement the processor implementable instructions, receiving the processor implementable instructions over a computer network. The computer network may comprise the Internet.

The processor implementable instructions received over the computer network may comprise instructions for providing at least one of: internet server functions; collection and processing of data from the Internet; and intensive processing of data received over the computer network.

At times when a need for heating in the building has been determined, but there is no demand for the by-product of computer processing resource, the method may further comprise operating the computer system to implement processor implementable instructions serving no useful purpose other than to facilitate the production of thermal energy. Such instructions may be arranged to produce thermal energy at a faster rate than would the instructions providing normal background processing functions of the computer system.

The method may further comprise communicating data indicating predicted future heating needs for a building over the computer network. In this way, the availability of the by-product of computer processing resource may be advertised in advance, thereby increasing the probability that it will be used to provide useful functionality. Furthermore, in this way, processor implementable instructions may be received over the computer network in advance of the predicted future heating need, for implementation at the time of the predicted future heating need.

The method may further comprise operating the computer system to provide home entertainment functions, desktop computing functions and/or local computer server functions, whether or not it has not been determined that there is a need for heating in the building.

The step of transferring the thermal energy from the computer system to at least one other location in the building may comprise transferring the thermal energy to a room of the building for space heating of the room or transferring the thermal energy to a thermal energy storage means in the form of a water-containing vessel.

Further features and/or advantages of the invention will be apparent from the detailed description which follows.

BRIEF DESCRIPTION OF THE DRAWINGS

Preferred embodiments of the invention will now be described, by way of example only, with reference to the accompanying drawings, in which.

DETAILED DESCRIPTION

The invention provides a heating apparatus for a domestic or commercial building. The apparatus comprises a controller for determining whether there is a need for heating in the building and a computer system for installation in the building. The computer system includes a data store, a program store storing processor implementable instructions, and at least one processor coupled to the data and program stores for implementing the stored instructions to thereby produce thermal energy. The apparatus also comprises a thermal energy distribution means arranged for transferring the thermal energy from the computer system to at least one other location in the building. The controller is arranged to operate the computer system to implement processor implementable instructions, to thereby produce thermal energy, in response to the determination by the controller of a need for heating in the building.

The invention also provides a method of heating a building using a computer system installed in the building and a distributed computer network comprising a plurality of heating apparatuses each of the type described above.

Figure 1:
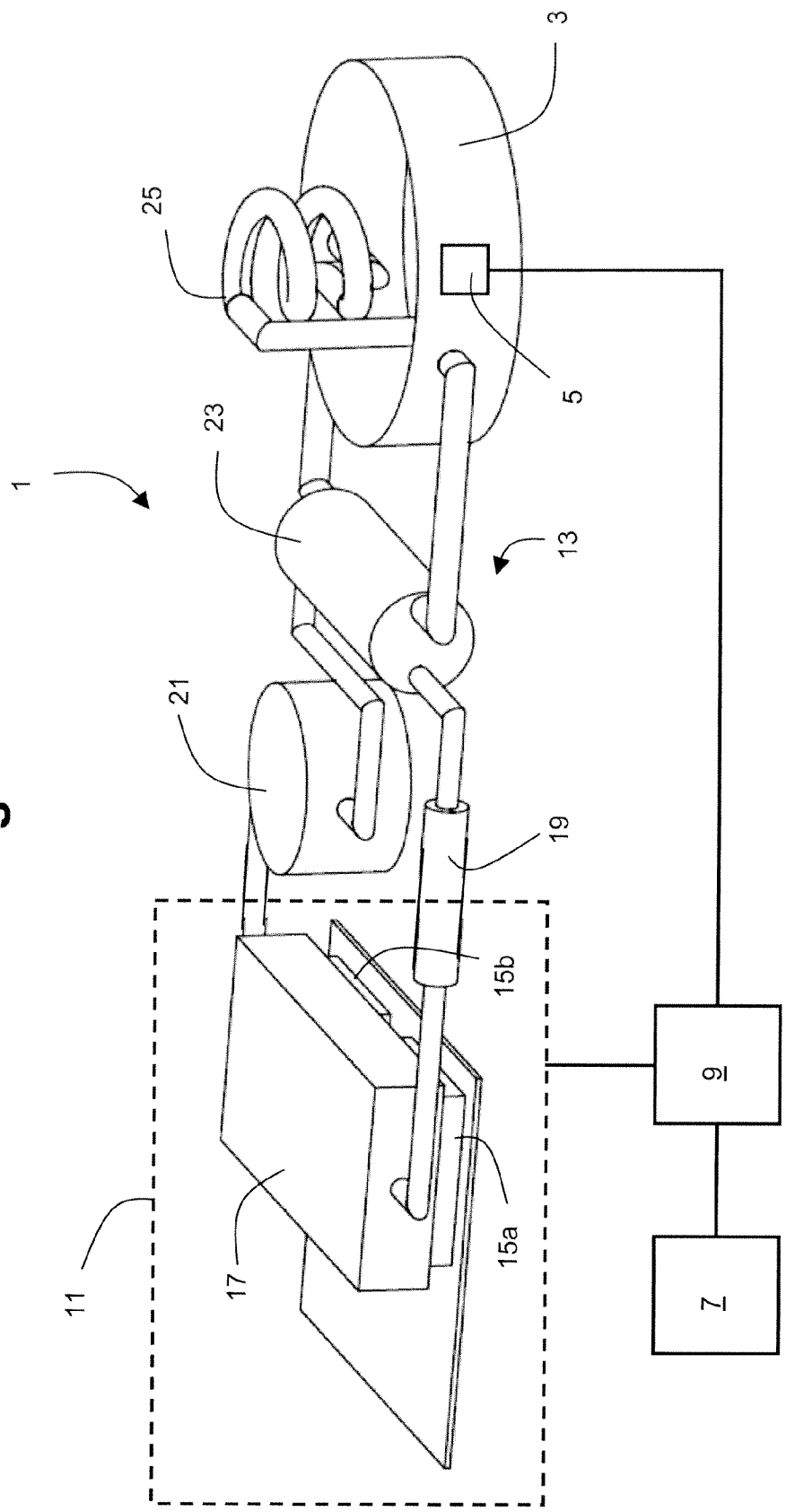
FIG. 1 is a schematic drawing of a heating apparatus according to the invention.

FIG. 1 is a schematic drawing of a heating apparatus 1 according to the invention. The apparatus 1 is installed in a domestic building (not shown) and is arranged for heating water in a domestic hot water tank 3. The apparatus comprises a temperature detector 5 installed in the hot water tank, a timer device 7, a controller 9 for determining whether there is a need for heating, a computer system 11 for producing thermal energy in response to the determination of a need for heating, and a thermal energy distribution means 13 arranged for transferring the thermal energy from the computer system 11 to the water in the hot water tank 3.

The hot water tank 3 shown in FIG. 1 is a standard domestic hot water tank and does not form a part of the heating apparatus 1. The hot water tank 3 is installed in any convenient location in the building and provides hot water for washing facilities. For example, the hot water tank may be installed in the roof space of the building. The temperature detector 5 may be a standard thermostatic temperature detector which is arranged to provide an output signal when the temperature of the water in the hot water tank 3 drops below a threshold temperature. The timer device 7 may be a standard timer device which is arranged to provide an output signal indicative of the time-of-day.

The controller 9 is arranged to receive the output signals from the temperature detector 5 and the timer device 7 and to determine whether there is a need to heat the water in the hot water tank 3 based on the output signals. The controller is arranged to provide a heating output signal to the computer system 11 when it is determined that there is a need for heating. The controller 9 is implemented with low-power electronic circuitry and comprises simple user controls and a display for enabling a user to store the times of the day at which hot water is required.

The computer system 11 is installed in any convenient location in the building, away from the hot water tank 3. For example, the computer system may be installed in a centrally located room of the building in which other facilities equipment is installed. The computer system 11 includes a data store and a program store storing processor implementable instructions, each of which may take the form of non-volatile memory devices (not shown). The computer system also comprises at least one processor 15a, 15b coupled to the data and program stores for implementing the stored instructions to thereby produce thermal energy. Two processors 15a, 15b are illustrated in the Figure, but embodiments of the invention may alternatively be provided with a single processor or more than two processors. The computer system 11 is provided with a power supply and communication interfaces (not shown). The computer system 11 may be implemented with a standard personal computer, although arrangements having multiple high-powered processors 15a, 15b are particularly favoured.

The thermal energy distribution means 13 is installed between the computer system 11 and the hot water tank 3. The thermal energy distribution means 13 comprises a heat sink 17 installed over the processors 15a, 15b of the computer system 11, which heat sink 17 is provided with a channel through which a fluid can be circulated to transfer thermal energy away from the processors 15a, 15b and the heat sink 17. An inlet end of the channel through the heat sink 17 may optionally be provided with a temperature detector and an output signal of this temperature detector may be used to ensure that the temperature of the fluid entering the channel is capable of maintaining the processors 15a, 15b at a safe working temperature.

The thermal energy distribution means 13 also comprises a heat pump having a refrigerant fluid circuit 19, a compressor 21 and a heat exchanger 23. The heat pump 19 is arranged to circulate refrigerant fluid through the heat sink 17, the compressor 21 and the heat exchanger 23 to thereby provide fluid passing through the heat exchanger 23 at a higher temperature than the fluid passing through the heat sink 17. Suitable heat exchanger designs will be apparent to those skilled in the art. The thermal energy distribution means 13 further comprises a water circuit 25 arranged to circulate water through the heat exchanger 23 and the hot water tank 3 to transfer thermal energy to the hot water tank 3. Although not clear from the schematic Figure, the water circuit 25 is relatively longer than the refrigerant fluid circuit 19 of the heat pump and spans most of the distance from the computer system 11 to the hot water tank 3.

In use of the apparatus 1, the controller 9 constantly determines whether there is a need for heating water in the hot water tank 3. In response to the determination that there is such a need, the computer system 11 is operated to produce thermal energy by implementing processor implementable instructions. The speed at which the instructions are implemented may be varied in order to vary the rate at which thermal energy is produced. By providing the computer system 11 with processor implementable instructions that perform a useful function, the apparatus is able to provide the useful by-product of computer processing resource. The thermal energy produced by the computer system is transferred from the computer system 11 to the hot water in the hot water tank 3 by the thermal energy distribution means 13.

The processor implementable instructions implemented by the computer system may provide internet server functions, collect and process data from the Internet and/or intensively process data received over a computer network. The computer system may also be operated at any time to provide home entertainment functions and/or desktop computing functions.

Figure 2:
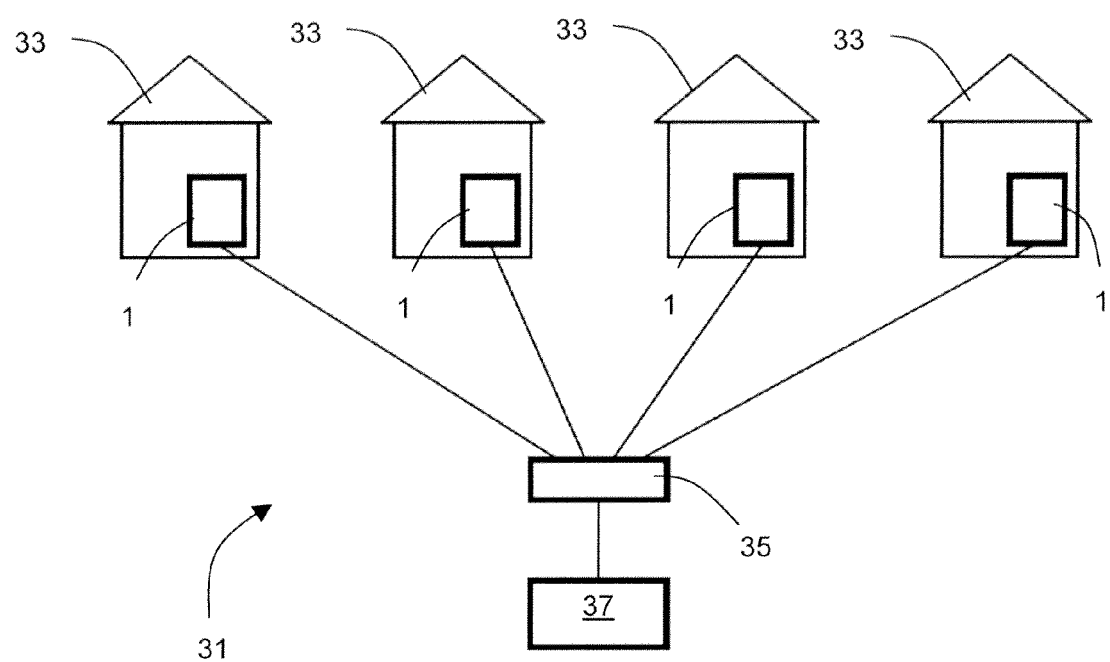
FIG. 2 is a schematic drawing of a distributed computer network according to the invention, the network comprising a plurality of heating apparatuses of the type shown in FIG. 1.

FIG. 2 is a schematic drawing of a distributed computer network 31 according to the invention. The network 31 comprises a plurality of heating apparatuses 1, each as described above with reference to FIG. 1.

Each heating apparatus 1 in the network is installed in a respective domestic building 33. Each apparatus 1 is provided with a computer network interface means in the form of an ADSL modem for providing a high speed connection to the Internet 35.

The network 31 also comprises a central controller 37 arranged for receiving data over the Internet 35 from the heating apparatuses 1, the data indicating predicted future heating needs in the respective buildings 33. The central controller 37, which may be implemented as a network server, is arranged for scheduling the use of the computer processing resource of the apparatuses 1 and for sending processor implementable instructions over the Internet 35 for implementation by the computer systems 11 of the apparatuses 1 at the time of the predicted future heating need.

The processor implementable instructions sent over the Internet 35 may comprise instructions for providing internet server functions, collection and processing of data from the Internet, and/or intensive processing of data received over the Internet 35.

Specific embodiments of the invention have been described above. However, various changes may be made to these embodiments without departing from the scope of the invention, as defined by the claims. Such changes will be apparent to those skilled in the art.

For example, the heating apparatus may be arranged to vary the usage of the computer processing resource depending on demand for different types of usage.

At times where there is a demand for computer processing resource, but no need for heating in the building, the heating apparatus may be arranged to operate the computer system to provide the computer processing resource, with the thermal energy that is produced being transferred to a secondary thermal energy store for subsequent use.

The heating apparatus and/or distributed computer network may comprise means for providing for the sale of the computer processing resource. The means may be arranged to vary the cost of the computer processing resource in dependence on whether the computer processing resource is provided at the same time as there is a need for heating in the building.

The heating apparatus and/or distributed computer network may comprise means for operating the computer system in dependence on the cost and/or availability of electricity and/or the cost and/or speed of the network connection.

The heating apparatus may be arranged to provide information on electricity usage and/or network connection usage to a user interface and/or the central controller.

The invention claimed is:

1. A heating apparatus for a domestic or commercial building, the apparatus comprising:
   a controller for determining whether or not there is a need for heating in the building;
   a computer system including a data store, a program store storing processor executable instructions, and at least one processor coupled to the data and program stores for executing the stored instructions, to thereby produce thermal energy; and
   a thermal energy distribution means arranged for transferring the thermal energy from the computer system resulting from operation of said computer system;
   wherein the controller is arranged to operate the computer system to execute the processor executable instructions, to thereby produce the thermal energy, in response to the determination by the controller of there being the need for heating in the building.

2. A heating apparatus as claimed in claim 1, wherein the thermal energy distribution means is arranged for transferring the thermal energy from the computer system to at least one of:
   another location in the building;
   a thermal energy storage means; and
   a medium used in an industrial process.

3. A heating apparatus as claimed in claim 1, wherein the controller is arranged to receive an output signal from a temperature detector and carry out the determination of whether there is a need for heating in the building based on the output signal of the temperature detector.

4. A heating apparatus as claimed in claim 1, further comprising a plurality of temperature detectors for installation in different locations in the building, wherein the controller is arranged to receive an output signal from each of the temperature detectors and carry out the determination of whether there is a need for heating in the building based on the output signals of the temperature detectors.

5. A heating apparatus as claimed claim 1, further comprising a timing device, wherein the controller is arranged to receive an output signal from the timing device and carry out the determination of whether there is a need for heating in the building based on the output signal of the timing device.

6. A heating apparatus as claimed in claim 1, wherein the thermal energy distribution means comprises a heat exchanger for transferring the thermal energy from the computer to a fluid flowing through the heat exchanger.

7. A heating apparatus as claimed in claim 1, wherein the thermal energy distribution means comprises a heat pump for the purpose of increasing the temperature associated with the thermal energy.

8. A heating apparatus as claimed in claim 1, further comprising a computer network interface means for coupling the computer system to a computer network, and wherein the computer system is arranged for executing the processor instructions received over the computer network interface means in response to the detection of a need for heating in the building.

9. A heating apparatus as claimed in claim 8, wherein the computer network interface means is arranged to couple the computer system to the Internet.

10. A heating apparatus as claimed in claim 1, wherein the computer system comprises a plurality of processors each provided on different integrated circuits.

11. A heating apparatus as claimed in claim 10, including a computer network interface means for coupling the computer system to a computer network, and wherein the computer system is arranged for executing the processor instructions received over the computer network interface means in response to the detection of a need for heating in the building, wherein the computer system further comprises routing means for routing data and/or processor executable instructions received over the computer network interface means to the plurality of processors.

12. A heating apparatus as claimed in claim 1, comprising a plurality of the computer systems.

13. A distributed computer network comprising a plurality of heating apparatuses in different domestic or commercial buildings, each apparatus comprising:
   a controller for determining whether or not there is a need for heating in the building;
   a computer system including a data store, a program store storing processor executable instructions, and at least one processor coupled to the data and program stores for executing the stored instructions, to thereby produce thermal energy;
   a thermal energy distribution means arranged for transferring the thermal energy from the computer system resulting from operation of said computer system; and
   a computer network interface means for coupling the computer system to a computer network,
   wherein the controller of each heating apparatus is arranged to operate the computer system to execute processor executable instructions, to thereby produce thermal energy, in response to the determination by the controller of there being the need for heating in the building, and wherein the computer system of each heating apparatus is arranged for executing processor executable instructions received over the computer network interface means in response to the detection of there being the need for heating in the building.

14. A method of heating a building using a computer system installed in the building, the computer system including a data store, a program store storing processor executable instructions, and at least one processor coupled to the data and program stores for executing the stored instructions, to thereby produce thermal energy, the method comprising:
   determining whether or not there is a need for heating in the building;
   in response to the determination of there being the need for heating in the building, operating the computer system to execute processor executable instructions, to thereby produce thermal energy; and
   transferring the thermal energy from the computer system resulting from operation of the computer system.

15. A method as claimed in claim 14, wherein the step of transferring the thermal energy comprises transferring the thermal energy from the computer system to at least one of:
   another location in the building;
   a thermal energy storage means; and
   a medium used in an industrial process.

16. A method as claimed in claim 15, further comprising, before the step of operating the computer system to execute the processor executable instructions:
   receiving the processor instructions over a computer network.

17. A method as claimed in claim 16, wherein the processor executable instructions received over the computer network comprise instructions for providing at least one of:
   internet server functions;
   collection and processing of data from the Internet; and
   intensive processing of data received over the computer network.

18. A method as claimed in claim 15, further comprising communicating data indicating predicted future heating needs over the computer network.

19. A method as claimed in claim 18, further comprising receiving processor executable instructions over the computer network for execution at the time of the predicted future heating need.

20. A method as claimed in claim 14, wherein the step of operating the computer system to execute processor executable instructions comprises executing processor executable instructions serving no useful purpose other than to facilitate the production of thermal energy.

21. A method as claimed in claim 14, further comprising operating the computer system to provide home entertainment functions, desktop computing functions and/or server computer functions.

22. A method as claimed in claim 14, wherein the step of transferring the thermal energy from the computer system comprises transferring the thermal energy to another room of the building for space heating of the room.

23. A method as claimed in claim 14, wherein the step of transferring the thermal energy from the computer system comprises transferring the thermal energy to a thermal energy storage means, wherein the thermal energy storage means is a water-containing vessel.

* * * * *